(12) United States Patent
Hirota et al.

(10) Patent No.: US 6,527,822 B2
(45) Date of Patent: *Mar. 4, 2003

(54) QUENCHED THIN RIBBON OF RARE EARTH/IRON/BORON-BASED MAGNET ALLOY

(75) Inventors: Koichi Hirota, Fukui-ken (JP); Takehisa Minowa, Fukui-ken (JP); Takahiro Hashimoto, Fukui-ken (JP); Koji Sato, Fukui-ken (JP); Kenji Yamamoto, Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/942,844

(22) Filed: Aug. 31, 2001

(65) Prior Publication Data

US 2002/0003007 A1 Jan. 10, 2002

Related U.S. Application Data

(62) Division of application No. 09/502,777, filed on Feb. 11, 2000, now Pat. No. 6,319,335.

(30) Foreign Application Priority Data

Feb. 15, 1999 (JP) .............................. 11-35394

(51) Int. Cl.$^7$ ........................ C22C 29/14; H01F 1/057
(52) U.S. Cl. ........................ 75/244; 148/302
(58) Field of Search ..................... 75/244; 148/302; 420/83, 121

(56) References Cited

U.S. PATENT DOCUMENTS

| 4,765,848 A | * | 8/1988 | Mohri et al. ............... 148/302 |
| 4,770,702 A | * | 9/1988 | Ishigaki et al. ............. 148/302 |
| 4,859,254 A | | 8/1989 | Mizoguchi et al. |
| 4,919,732 A | * | 4/1990 | Yang et al. ................ 148/101 |
| 5,011,552 A | | 4/1991 | Otsuka et al. |
| 5,041,172 A | | 8/1991 | Tokunaga et al. |
| 5,071,493 A | | 12/1991 | Mizoguchi et al. |
| 5,110,377 A | | 5/1992 | Yamamoto et al. |
| 5,123,979 A | | 6/1992 | Tenaud et al. |
| 6,319,335 B1 | * | 11/2001 | Hirota et al. ............... 148/302 |
| 6,322,637 B1 | * | 11/2001 | Hirota et al. ............... 148/302 |

FOREIGN PATENT DOCUMENTS

EP   0 633 581   1/1995

OTHER PUBLICATIONS

Meekison et al., IEEE Transactions on Magnetics, 26 (No. 5), pp. 1736–1738 (1990).*
Bernardi et al., Journal of Applied Physics, 83 (No. 11, part 2), pp. 6396–6398 (1998).*

* cited by examiner

Primary Examiner—John Sheehan
(74) Attorney, Agent, or Firm—Wenderoth, Lind & Ponack, L.L.P.

(57) ABSTRACT

Disclosed is a novel thin ribbon of a rare earth/iron/boron-based magnet alloy prepared by quenching of an alloy melt by the method of strip casting, from which a sintered permanent magnet is obtained by the powder metallurgical method. The sintered permanent magnet can be imparted with greatly improved magnetic properties or, in particular, residual magnetic flux density when the thin alloy ribbon as the base material thereof has a metallographic phase structure containing "four-phase regions" consisting of (a) an α-iron phase, (b) a R-rich phase, in which R is a rare earth element selected from praseodymium, neodymium, terbium and dysprosium, (c) a $R_xT_4B_4$ phase, in which T is iron or a combination of iron and a transition metal element other than iron and rare earth elements and x is a positive number varying with the rare earth element, and (d) a $R_2T_{14}B$ phase, in which R and T each have the same meaning as defined above, each phase being dispersed with a grain diameter in a limited range, in a volume fraction of from 1 to 10%.

5 Claims, 7 Drawing Sheets

QUENCHED THIN RIBBON OF RARE EARTH/IRON/BORON-BASED MAGNET ALLOY

This is a divisional of Ser. No. 09/502,777, filed Feb. 11, 2000 now U.S. Pat. No. 6,319,335

BACKGROUND OF THE INVENTION

The present invention relates to a thin ribbon of a rare earth/iron/boron-based magnet alloy prepared by the strip casting method and useful as a base material of a rare earth-based permanent magnet having greatly improved magnetic properties.

Permanent magnets belong to a class of very important key materials in a great variety of instruments built under the most advanced technology in the field of electric and electronic industries covering from household electric appliances in general to peripheral terminals of computers and medical instruments. Along with the recent progress in the fields of computers and communication instruments, the electric and electronic instruments are desired to be more and more compact in size and lighter and lighter in weight and to exhibit higher and higher performance. It is apparent that these requirements cannot be satisfied without great upgrading of the permanent magnets built in the instruments as a key component.

As is well known, rare earth-based permanent magnets are widely used in the above mentioned fields as a class of high-performance permanent magnets, of which the rare earth/iron/boron-based magnets are the most promising in respect of their outstandingly excellent magnetic properties and economical advantages due to the relatively low material costs. The rare earth/iron/boron-based or, in particular, neodymium/iron/boron-based permanent magnet alloy is prepared usually by the mold casting method or by the strip casting method. The magnet alloy prepared by these methods is processed into a permanent magnet by the well known powder metallurgical process involving the step of magnetic orientation of the alloy particles under compression molding in a magnetic field.

In the above mentioned mold casting method for the preparation of a magnet alloy, the constituent elements each in the metallic or elementary form are melted together in a crucible to give an alloy melt which is cast into a casting mold followed by solidification therein to give an ingot of the alloy which is processed into magnets by the powder metallurgical method. This method is widely practiced in respect of the advantage that the chemical composition of the magnet alloy can easily be controlled. A problem in the mold casting method described above, however, is that, since the velocity of heat transfer is relatively low between the mold walls and the alloy melt and within the alloy melt per se, a long time is taken for solidification of the whole volume of the melt to give a solid of the magnet alloy so that the γ-iron is crystallized as the primary crystals during the process of solidification of the molten alloy to form grains of the γ-iron phase having a diameter of 10 $\mu$m or larger left in the core portion of the ingot block. In addition, the phase rich in the content of the rare earth element, referred to as a R-rich phase hereinafter, and the $R_xT_4B_4$ phase, in which R is a rare earth element or a combination of rare earth elements, T is a transition metal element or typically iron and the subscript x is a positive number larger than 1 varying with the content of the rare earth element, surrounding the $R_2T_{14}B$ phase as the principal phase in the permanent magnet are in the form of coarse grains of a large diameter.

Moreover, the metallographic structure of the alloy ingot cannot be uniform enough between the surface layer of the ingot solidified in contact with or in the vicinity of the mold wall and the core portion of the ingot remote from the surface layer due to non-uniformity in the cooling rate resulting in variations in the grain diameter of the $R_2T_{14}B$ phase and the R-rich phase. Consequently, difficulties are encountered in the process of pulverization of the alloy ingot into a fine powder having a particle diameter of a few $\mu$m and the particle size distribution of the alloy powder cannot be uniform enough adversely affecting the magnetic properties of the permanent magnets finally obtained by the powder metallurgical method due to poor magnetic orientation of the alloy particles and poor sintering behavior of the powder compact.

In the strip casting method, on the other hand, a melt of the magnet alloy is continuously ejected at the surface of a rotating quenching roller of the single-roller type or twin-roller type to prepare a thin ribbon of the solidified alloy having a thickness of 0.01 to 5 mm. This method is advantageous for obtaining a high-performance R/T/B-based permanent magnet because the metallographic phase structure of the magnet alloy in the form of a thin ribbon can be controlled by adequately selecting the quenching conditions of the alloy melt. For example, precipitation of the α-iron phase can be decreased or the R-rich phase and the $R_xT_4B_4$ phase can be dispersed with increased fineness and uniformity.

With an object to further improve the magnetic properties of the R/T/B-based permanent magnets obtained from a magnet alloy prepared by the strip casting method, detailed and extensive investigations have been undertaken on the metallographic structure of the thin alloy ribbon prepared by the strip casting method or, in particular, on the mode of precipitation of the α-iron phase and structure thereof leading to a proposal for a thin alloy ribbon in which the α-iron phase is finely dispersed in a size of smaller than 10 $\mu$m within the crystalline grains of the principal phase as the peritectic nuclei (Japanese Patent No. 2639609) and a thin alloy ribbon substantially free from segregation of the α-iron phase (Japanese Patent No. 2665590 and Japanese Patent Kokai 7-176414).

In addition to the above, a great number of reports, in compliance with the unlimitedly growing desire for upgrading of rare earth-based permanent magnets, are dedicated to the method for the preparation of the R/T/B-based permanent magnets. Despite the so large number of reports in this field, almost no reports are available on the relationship between the phase-precipitation mode or metallographic phase structure of the thin alloy ribbons and the magnetic properties of the permanent magnets obtained therefrom by directing attention to the region where four phases are jointly found, referred to as the four-phase region hereinafter, including, in addition to the α-iron phase, the R-rich phase and the $R_xT_4B_4$ phase in combination with the $R_2T_{14}B$ phase as the principal phase.

SUMMARY OF THE INVENTION

The present invention accordingly has an object, by directing the inventors' attention to the above mentioned four-phase region, to provide a quenched thin ribbon of the R/T/B-based magnet alloy, from which a rare earth-based permanent magnet having greatly improved magnetic properties can be prepared by the powder metallurgical process.

Thus, the above mentioned object of the invention can be accomplished by a thin ribbon of a rare earth-based magnet alloy, which is a product by the strip casting method, having a metallographic phase structure of which the volume fraction of the four-phase region consisting of (a) an α-iron phase in a grain diameter of 0.1 to 20 μm, (b) a R-rich phase, in which R is a rare earth element selected from praseodymium, neodymium, terbium and dysprosium, in a grain diameter of 0.1 to 20 μm, (c) a $R_xT_4B_4$ phase, in which R has the same meaning as defined above, T is iron or a combination of iron and a transition metal element other than iron and the rare earth elements and x is a positive number larger than 1 varying with the content of the rare earth element, in a grain diameter of 0.1 to 10 μm and (d) a $R_2T_{14}B$ phase, in which R and T each have the same meaning as defined above, in a grain diameter of 0.1 to 20 μm, each phase being uniformly dispersed in the four-phase region, is in the range from 1 to 10% by volume, with the proviso that the rest of the volume fraction consists of the R-rich phase, $R_xT_4B_4$ phase and $R_2T_{14}B$ phase or consists of the R-rich phase and $R_2T_{14}B$ phase.

The present invention is applicable particularly advantageously to a rare earth-based permanent magnet alloy of the R/T'/B-type or R/T/B/M-type (T=T'+M), of which R is a rare earth element, T' is iron or a combination of iron and cobalt and M is an element selected from the group consisting of titanium, niobium, aluminum, vanadium, manganese, tin, calcium, magnesium, lead, antimony, zinc, silicon, zirconium, chromium, nickel, copper, gallium, molybdenum, tungsten and tantalum, consisting of from 5 to 40% by weight of the rare earth element, from 50 to 90% by weight of the element T', 2–8% by weight of boron and, if any, up to 8% by weight of the element M.

DETAILED DESCRIPTION OF THE PREFERRED EMBODIMENTS

Figure 1:
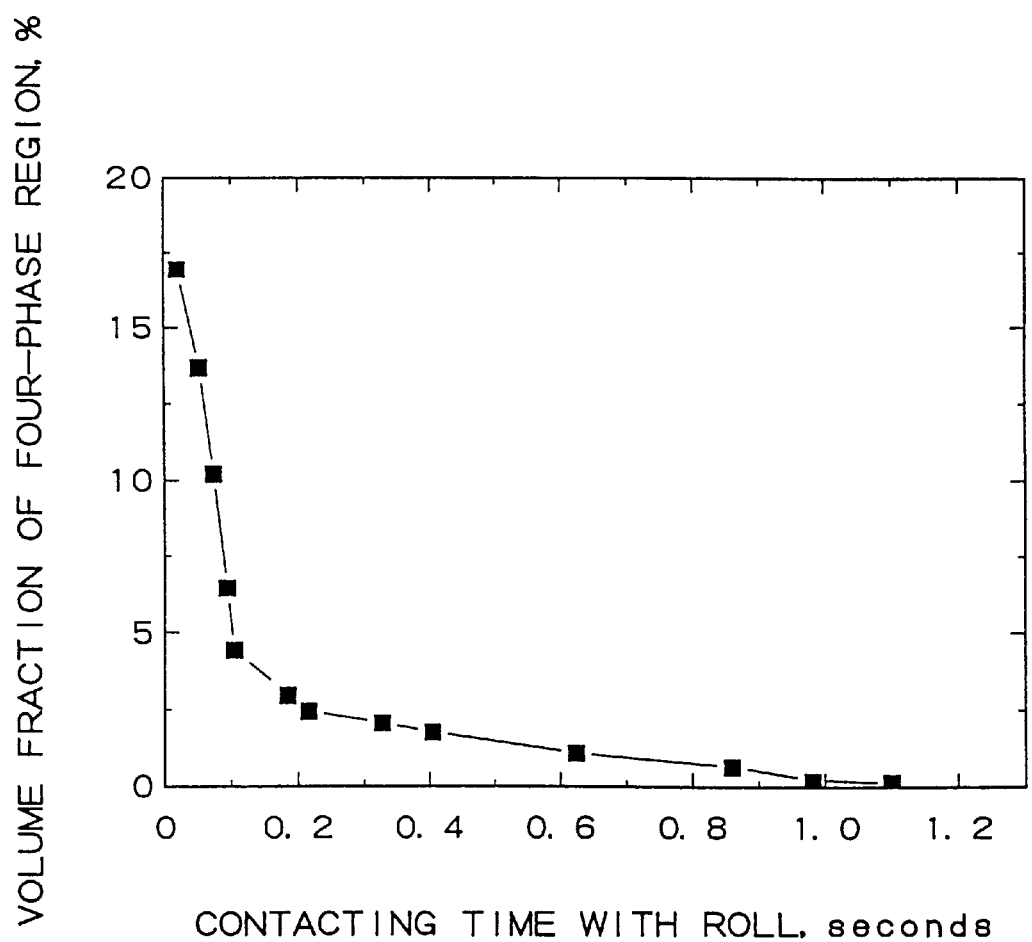
FIG. 1 is a graph showing the volume fraction of the four-phase region in the quenched thin ribbons as a function of the contacting time of the melt with the quenching roller.

The above defined thin ribbon of a rare earth-based magnet alloy is a result of the extensive studies conducted by the inventors on the relationship between the metallographic phase structure of the thin alloy ribbon and the magnetic properties of the permanent magnet prepared from the thin alloy ribbon leading to an unexpected discovery that a greatly improved residual magnetic flux density of the permanent magnet can be obtained when the volume fraction of the four-phase region jointly consisting of the α-iron phase, R-rich phase, $R_xT_4B_4$ phase and $R_2T_{14}B$ phase in the thin alloy ribbon is within a specific range and the grain diameter of each of these four phases is within a specific range.

The thin ribbon of the rare earth-based magnet alloy defined above is a product prepared by the strip casting method from an alloy melt consisting mainly of a rare earth element, iron and boron. Namely, the alloy melt is ejected continuously at the surface of a single-roller type or twin roller-type quenching roller system where the alloy melt is quenched and solidified into the form of a thin ribbon having a thickness usually in the range from 10 to 500 μm and a width in the range from 5 to 500 mm depending on the dimensions of the quenching roller. The characterizing parameters of the inventive thin alloy ribbon relative to the volume fraction of the four-phase region and the grain diameter of each of these four phases can be controlled within the above specified ranges by adequately selecting the quenching conditions in the strip casting method. In order to accomplish the above described various requirements, the quenching rate of the melt on the quenching roller is preferably in the range from 500 to 10000° C./second and the contacting time of the alloy melt with the surface of the quenching roller is at least 0.1 second or, preferably, in the range from 0.1 to 0.4 second.

The above mentioned four-phase region is a region formed of a fine and uniform dispersion of coexisting four phases including (a) the α-iron phase, (b) the R-rich phase, i.e. a phase of higher content of R than the $R_2T_{14}B$ phase, (c) the $R_xT_4B_4$ phase (x=1+ε, ε being a positive number not exceeding 0.2 depending on R) and (d) the $R_2T_{14}B$ phase. The value of ε, which is 0.1 or a number somewhat larger than 0.1 depending on the rare earth elements, as reported include the values of 0.10–0.11 for praseodymium, 0.10–0.11 for neodymium, 0.14–0.16 for terbium and 0.15–0.16 for dysprosium. In each of these phases, the crystalline grains essentially have a grain diameter in the range from 0.1 to 20 μm or preferably from 0.1 to 10 μm, from 0.1 to 20 μm or preferably from 0.1 to 10 μm, from 0.1 to 10 μm or preferably from 0.1 to 5 μm and from 0.1 to 20 μm or preferably from 0.1 to 10 μm, respectively.

When the above described grain size limitation for each of the four phases (a) to (d) is satisfied, a reaction takes place, in the course of the sintering heat treatment of a powder compact prepared from a fine powder of the thin alloy ribbon for the preparation of a permanent magnet, among the fine grains of the phases (a), (b) and (c) to generate the phase (d). This reaction among the grains proceeds very actively to produce fresh grains of the $R_2T_{14}B$ phase which become combined to the existing magnetically oriented grains of the $R_2T_{14}B$ phase without disturbing the magnetic orientation thereof. As a result, a R/T/B-based permanent magnet having greatly improved magnetic properties can be obtained with an increase in the density of the magnet as sintered and an increased residual magnetic flux density. On the other hand, the above mentioned reaction hardly proceeds when the grain size of the respective phases deviates out of the respectively specified ranges.

The average grain diameter of the phases (a), (b) and (d) can be determined by examining the secondary electron image or the reflected electron image taken for a cross section of the thin alloy ribbon. This technique, however, is not applicable to the $R_xT_4B_4$ phase which is rich in the content of boron little susceptible to and hardly detectable by the reflected electron images. Instead, the average grain diameter of this phase can be determined by examining the Auger electron image taken for a broken-out section of the thin alloy ribbon.

The thin alloy ribbon of the invention contains the above described four-phase region essentially in a volume fraction in the range from 1 to 10% or, preferably, from 2 to 5%. When the volume fraction of the four-phase region is too large, a great decrease is resulted in the residual magnetic flux density and the coercive force of the permanent magnet prepared from the thin alloy ribbon. When the volume fraction thereof is too small, substantially no improvement can be obtained in the residual magnetic flux density of the permanent magnet. The volume fraction of the four-phase region in the inventive thin alloy ribbon can be determined from the secondary electron image or reflected electron image taken for a cross section of the thin alloy ribbon.

The thin ribbon of the magnet alloy prepared in the above described manner is processed into a sintered permanent magnet by pulverizing, optionally, after hydrogen decrepitation, compression-molding in a magnetic field, sintering in an inert atmosphere at 900 to 1150° C. and finally aging at 400 to 600° C.

In the following, the thin ribbon of the rare earth-based magnetic alloy according to the present invention is described in more detail by way of Examples and Comparative Examples which, however, never limit the scope of the invention in any way.

EXAMPLE 1 AND COMPARATIVE EXAMPLE 1

A thin ribbon of a rare earth-based magnet alloy was prepared by the strip casting method from an alloy melt obtained by melting together neodymium metal, dysprosium metal, electrolytic iron, cobalt metal, ferroboron, aluminum metal and copper metal in such a proportion as to give an alloy composition of 30.0% by weight of neodymium, 1.0% by weight of dysprosium, 4.0% by weight of cobalt, 1.1% by weight of boron, 0.3% by weight of aluminum and 0.2% by weight of copper, the balance to 100% being iron. The volume fraction of the four-phase region in the thin alloy ribbons was varied in the range from 0 to 13.7% by controlling the contacting time of the alloy melt with the surface of the quenching roller in the range from 0.02 to 1.0 second. The cooling rate of the alloy melt was in the range from 5000 to 9000° C./second. The four phases (a), (b), (c) and (d) constituting the four-phase region each had an average grain diameter of 3 $\mu$m, 7 $\mu$m, 1 $\mu$m and 10 $\mu$m, respectively.

Figure 2:
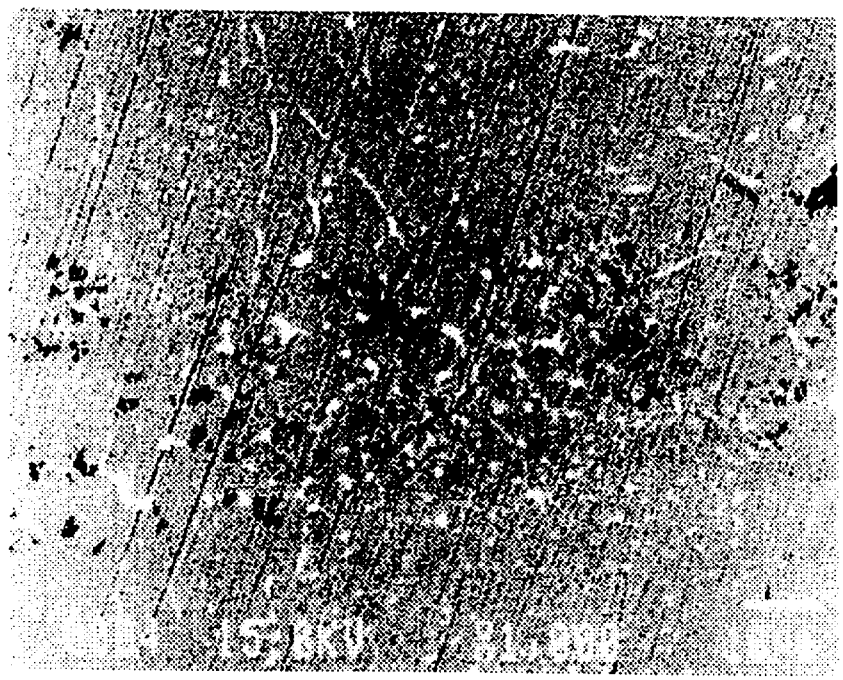
FIG. 2 is a photographic reflected electron image of the four-phase region in a thin alloy ribbon.

FIG. 1 is a graph showing the volume fraction of the four-phase region in the thin ribbons as a function of the contacting time. As is clear from this figure, the volume fraction of the four-phase region is decreased as a trend as the contacting time is increased. When the contacting time is 0.1 to 0.4 second, in particular, the volume fraction of the four-phase region is preferably in the desirable range from 2 to 5% by volume FIG. 2 is a reflected electron image taken for a cross section of one of the above prepared thin alloy ribbons containing 5% by volume of the four-phase region. In the photograph of FIG. 2, the black speckles correspond to the α-iron phase, the gray areas correspond to the $R_2T_{14}B$ phase and the white areas correspond to the R-rich phase. The photograph shows fine and uniform dispersion of each of these three phases within the four-phase region. The $R_xT_4B_4$ phase, on the other hand, is not susceptible to the determination of the average grain diameter due to the high content of boron from which the reflected electrons can hardly be detected.

Figure 3:
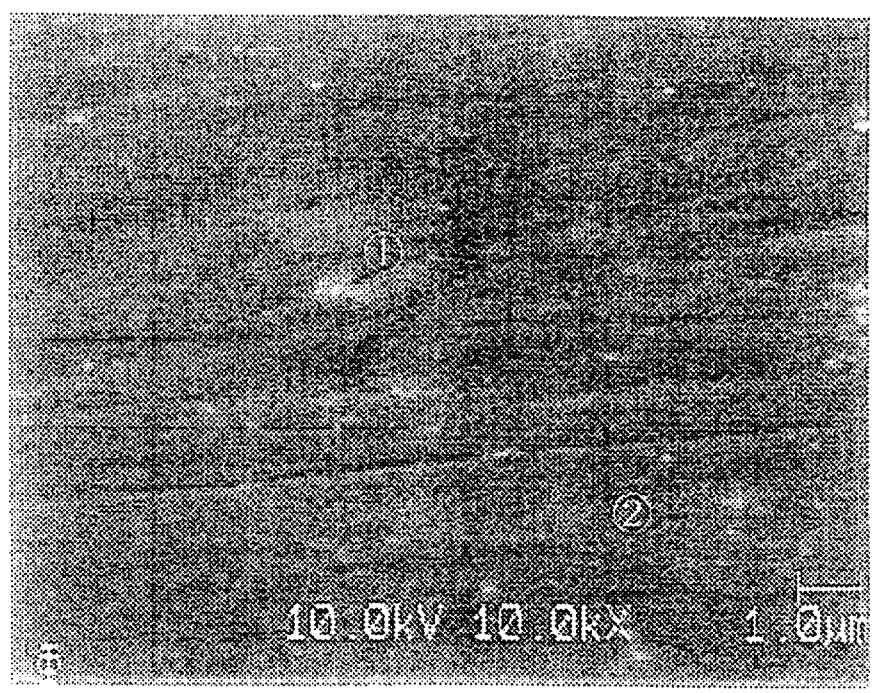
FIG. 3 is a photographic secondary electron image of the four-phase region in a thin alloy ribbon.
Figure 4:
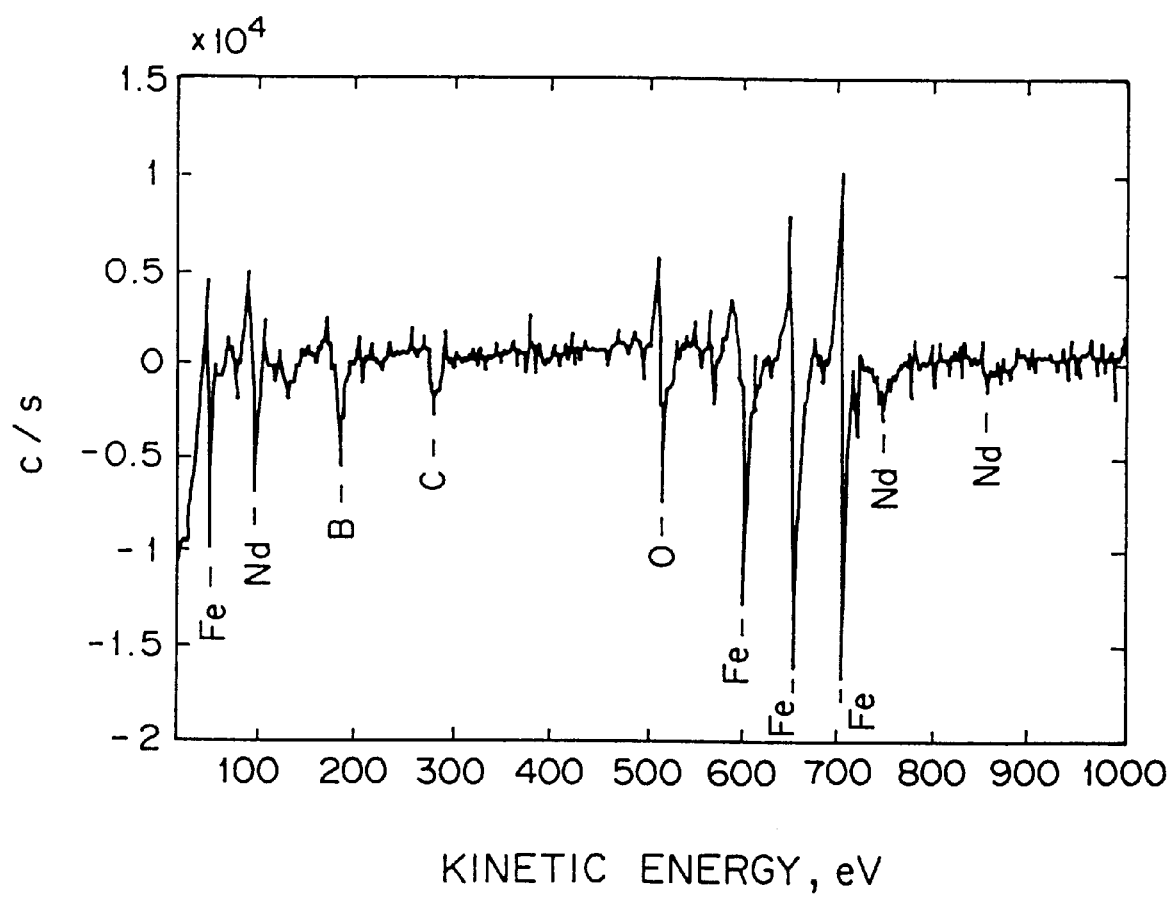
FIGS. 4 and 5 are each an Auger electron spectrum of the spots 1 and 2, respectively, indicated on the photograph of FIG. 3.
Figure 5:
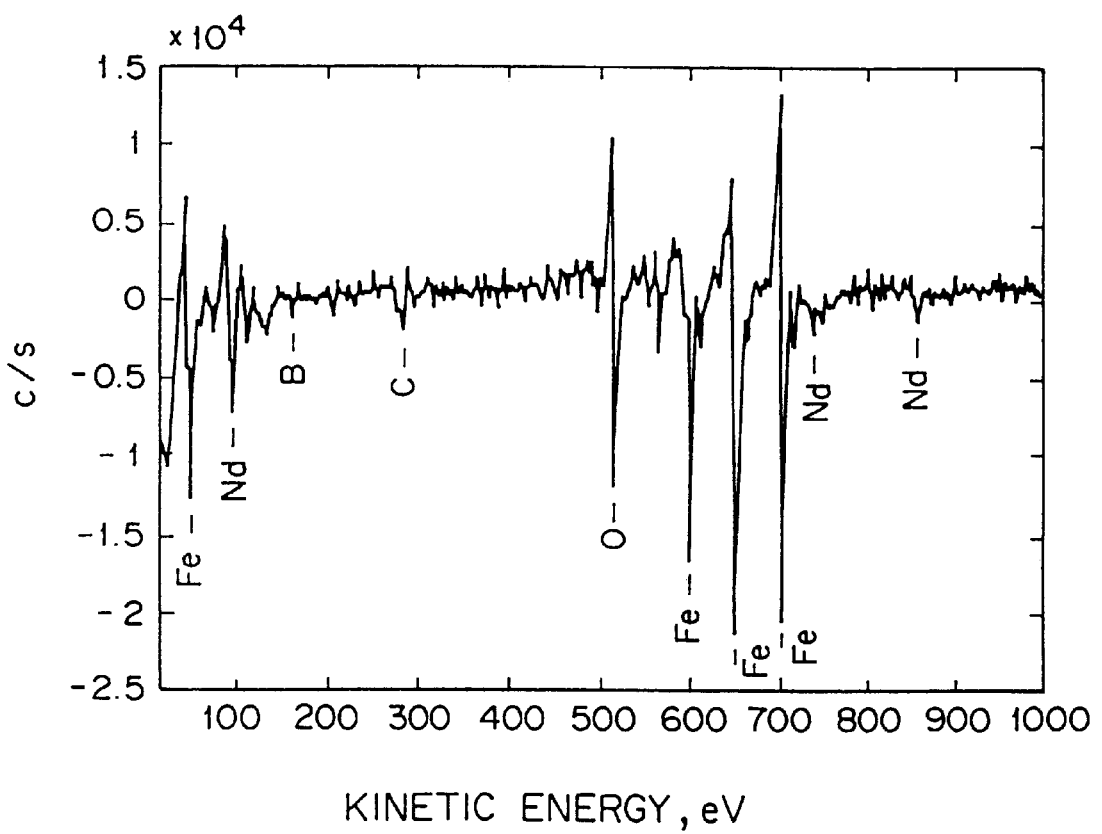

FIG. 3 is a secondary electron image of the four-phase region of the same thin alloy ribbon as for FIG. 2, of which an Auger electron spectrum was taken for the spot 1 or 2 indicated on the photograph of FIG. 3 to give the results shown in FIGS. 4 and 5, respectively. Comparison of these spectra leads to a conclusion that the spot 1 corresponds to the $R_xT_4B_4$ phase which is richer in the content of boron than the peripheral phase at the spot 2 within the four-phase region.

Figure 6:
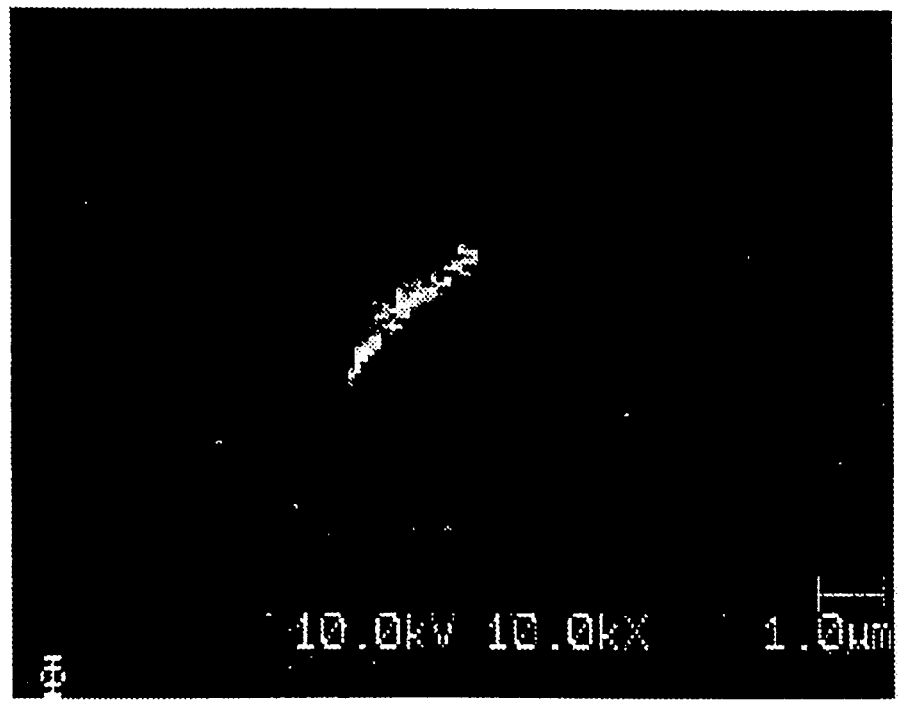
FIGS. 6 and 7 are an Auger electron image photograph and a schematic sketch of the same view field, respectively, in a thin alloy ribbon showing the $R_xT_4B_4$ phase.
Figure 7:
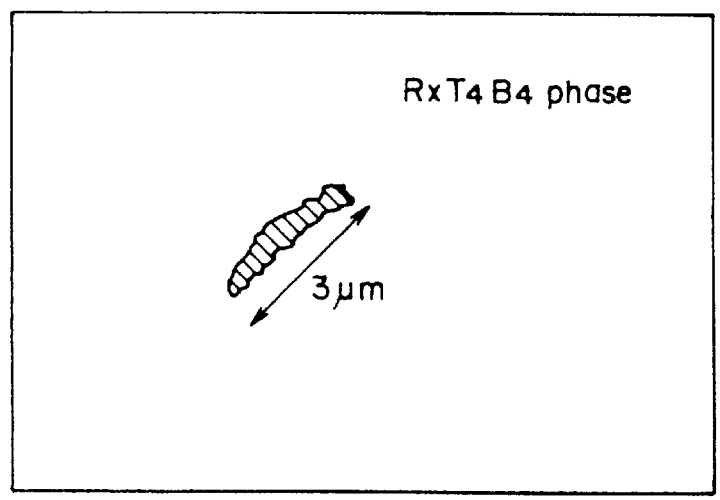

FIG. 6 is a photographic Auger electron image of boron in the $R_xT_4B_4$ phase. FIG. 7 is a schematic sketch of the same view field which indicates that the phase is dispersed in the four-phase region with a grain dimension of about 3 $\mu$m.

In the next place, each of the thin alloy ribbons was subjected first to a hydrogenation treatment and then to a dehydrogenation treatment followed by pulverization in a jet mill with nitrogen as the jet gas to give a fine alloy powder having an average particle diameter of about 3 $\mu$m. The alloy powder was compression-molded in a metal mold under a compressive pressure of 1 ton/cm$^2$ within a magnetic field of 12 kOe in a direction perpendicular to the direction of compression to give a powder compact which was subjected to a sintering heat treatment in an atmosphere of argon first by heating at 1050° C. for 2 hours followed by cooling and then by heating at 500° C. for 1 hour to effect aging giving a sintered permanent magnet.

Figure 8:
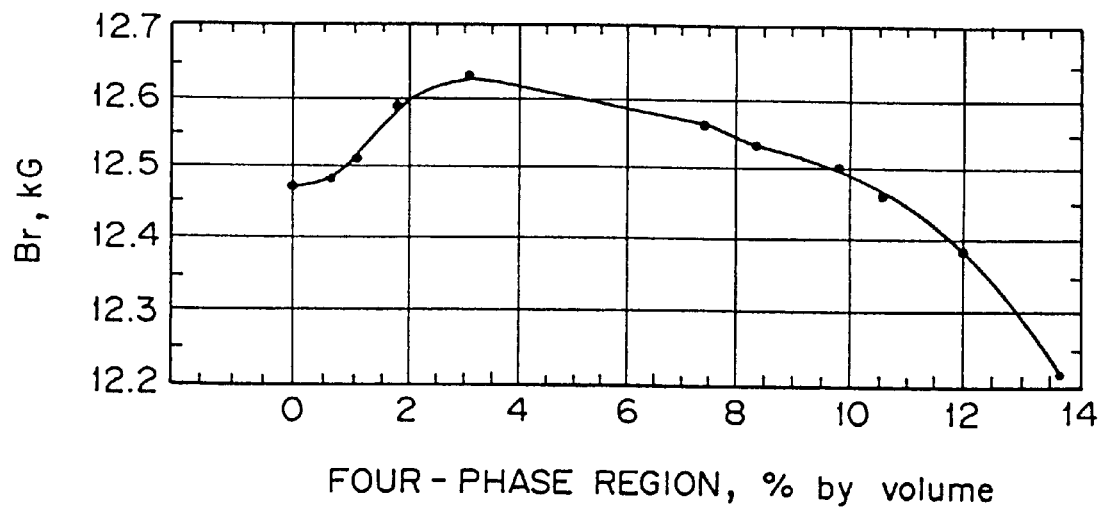
FIGS. 8 and 9 are each a graph showing the residual magnetic flux density Br of the permanent magnets prepared in Example 1 and in Example 2, respectively, as a function of the volume fraction of the four-phase region in the thin alloy ribbon.

The thus obtained sintered permanent magnets were subjected to the measurement of the residual magnetic flux density Br to give the result graphically shown in FIG. 8 as a function of the volume fraction of the four-phase region in the respective thin alloy ribbons. As is understood from this graph, a substantial improvement can be obtained in the residual magnetic flux density when the volume fraction of the four-phase region is in the range from 1 to 10% or, more remarkably, in the range from 2 to 5%. When the volume fraction of the four-phase region is too small, no substantial improvement can be obtained in the residual magnetic flux density as compared with a thin ribbon alloy containing no four-phase region while, when the volume fraction thereof is too large to exceed 10%, the residual magnetic flux density is rather decreased to be lower than the value obtained in the absence of the four-phase region.

EXAMPLE 2 AND COMPARATIVE EXAMPLE 2

The procedure for the preparation of thin alloy ribbons was about the same as in Example 1 except that the alloy melt was prepared from the same base materials in such a proportion corresponding to 28.0% by weight of neodymium, 1.0% by weight of cobalt, 1.1% by weight of boron and 0.3% by weight of aluminum, the balance to 100% being iron, and that the quenching conditions in the strip casting were controlled so as to give thin alloy ribbons of which the volume fraction of the four-phase region was varied in the range from 0 to 13.5%. The grain diameters of the four phases (a), (b), (c) and (d) were 3 $\mu$m, 5 $\mu$m, 1 $\mu$m and 10 $\mu$m, respectively. The fine powder of the thin alloy ribbon was admixed with a small amount of a sintering aid and subjected to a sintering heat treatment in the same manner as in Example 1 to give sintered permanent magnets.

Figure 9:
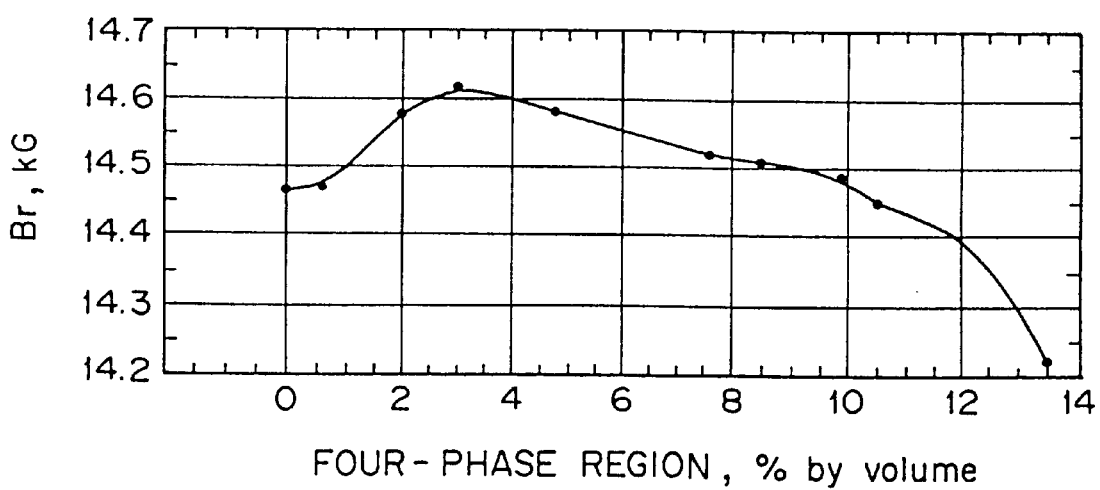

Measurements of the residual magnetic flux density was undertaken for the thus prepared permanent magnets to give the results graphically shown in FIG. 9 as a function of the volume fraction of the four-phase region in the thin alloy ribbons, which led to substantially the same conclusion as that derived from FIG. 8.

Figure 10:
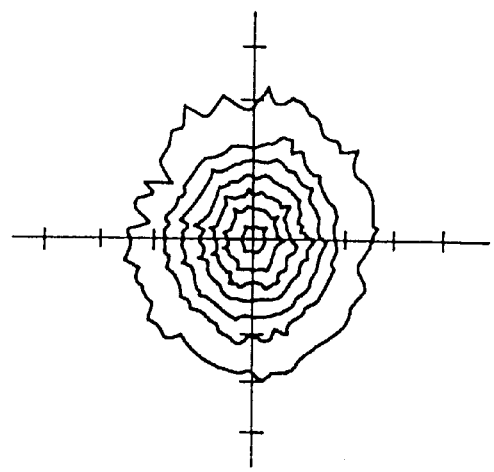
FIGS. 10 and 11 are each a (006) pole figure of the sintered magnet body prepared from a thin alloy ribbon of which the volume fraction of the four-phase region is 0.5% and 3%, respectively.
Figure 11:
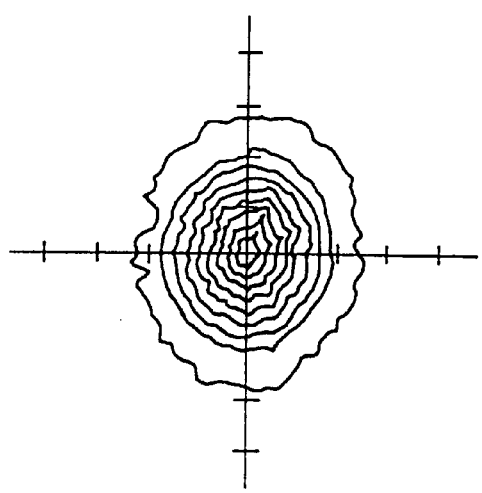

Further, evaluation was made by the X-ray pole figure method for the degree of crystalline orientation in the sintered bodies obtained from the thin alloy ribbons having different volume fractions of the four-phase region to give the results shown in FIGS. 10 and 11 which are each a (006) pole figure corresponding to 0.5% and 3%, respectively, of the volume fraction of the four-phase region. As is understood from comparison of these two figures, the contour lines for the 3% volume fraction of the four-phase region distribute in a higher density than those for the 0.5% volume fraction indicating a higher degree of crystalline orientation.

What is claimed is:

1. A rare earth-based permanent magnet which is a sintered body of a powder of a thin ribbon of a rare earth-based magnet alloy, having a metallographic phase structure of which the volume fraction of a four-phase region consisting of (a) an α-iron phase having α-iron grains with a grain diameter of 0.1 to 20 μm, (b) an R-rich phase which is a phase richer in the content of rare earth element than in an $R_2T_{14}B$ phase, R being a rare earth element selected from praseodymium, neodymium, terbium and dysprosium, said R-rich phase having R-rich grains with a grain diameter of 0.1 to 20 μm, (c) an $R_xT_4B_4$ phase, in which R has the same meaning as defined above, T is iron or a combination of iron and a transition metal element other than iron and the rare earth elements and x is a positive number larger than 1 varying with the rare earth element, said $R_xT_4B_4$ phase having $R_xT_4B_4$ grains with a grain diameter of 0.1 to 10 μm and (d) the $R_2T_{14}B$ phase, in which R and T each have the same meaning as defined above, the $R_2T_{14}B$ phase having $R_2T_{14}B$ grains with a grain diameter of 0.1 to 20 μm, each phase being uniformly dispersed in the four-phase region, is in the range from 1 to 20% by volume, with the proviso that the rest of the volume fraction consists of the R-rich phase, $R_xT_4B_4$ phase and $R_2T_{14}B$ phase or consists of the R-rich phase and $R_2T_{14}B$ phase.

2. The rare earth-based permanent magnet as claimed in claim 1 of which the volume fraction of the four-phase region is in the range from 2 to 5%.

3. The rare earth-based permanent magnet as claimed in claim 1 in which the phases (a), (b), (c) and (d) in the four-phase region have grain diameters in the ranges from 0.1 to 10 μm, from 0.1 to 10 μm, from 0.1 to 5 μm and from 0.1 to 10 μm, respectively.

4. The rare earth-based permanent magnet as claimed in claim 1 in which the transition metal element denoted by T other than iron and the rare earth elements is cobalt.

5. The rare earth-based permanent magnet as claimed in claim 1 wherein the powder is obtained by hydrogen decrepitation and pulverization of the thin ribbon of a rare earth-based magnet alloy.

* * * * *